United States Patent [19]
Bülow et al.

[11] Patent Number: 6,143,057
[45] Date of Patent: Nov. 7, 2000

[54] ADSORBENTS AND ADSORPTIVE SEPARATION PROCESS

[75] Inventors: Martin Bülow, Basking Ridge; Frank R. Fitch, Bedminster; Adeola Florence Ojo, Scotch Plains, all of N.J.

[73] Assignee: The BOC Group, Inc., Murray Hill, N.J.

[21] Appl. No.: 09/298,758

[22] Filed: Apr. 23, 1999

[51] Int. Cl.[7] .................................................. B01D 53/43
[52] U.S. Cl. ..................................... 95/96; 95/99; 95/127; 95/130; 95/139; 95/143; 96/108; 96/143; 502/79
[58] Field of Search ............................. 95/96–106, 127, 95/130, 139, 143, 902; 96/108, 130, 143; 423/328.2, 330.1, DIG. 21; 502/79

[56] References Cited

U.S. PATENT DOCUMENTS

| | | | |
|---|---|---|---|
| 2,882,243 | 4/1959 | Milton | 252/455 |
| 2,882,244 | 4/1959 | Milton | 252/455 |
| 4,173,622 | 11/1979 | Robertson | 423/329 |
| 4,194,891 | 3/1980 | Earls et al. | 95/130 X |
| 4,194,892 | 3/1980 | Jones et al. | 95/130 X |
| 4,303,629 | 12/1981 | Strack et al. | 423/329 |
| 4,443,422 | 4/1984 | Kostinko | 423/329 |
| 4,859,217 | 8/1989 | Chao | 95/902 X |
| 4,892,720 | 1/1990 | Skeels et al. | 423/328 |
| 4,950,312 | 8/1990 | Puppe et al. | 95/902 X |
| 4,964,888 | 10/1990 | Miller | 95/130 X |
| 5,152,813 | 10/1992 | Coe et al. | 95/902 X |
| 5,228,888 | 7/1993 | Gmelin et al. | 95/130 X |
| 5,292,360 | 3/1994 | Pacaud et al. | 95/902 X |
| 5,531,808 | 7/1996 | Ojo et al. | 95/902 X |
| 5,609,842 | 3/1997 | Tsybulevski et al. | 95/902 X |
| 5,922,107 | 7/1999 | Labasque et al. | 95/130 X |
| 5,962,358 | 10/1999 | Hees et al. | 95/902 X |
| 6,024,781 | 2/2000 | Bülow et al. | 95/902 X |
| 6,036,939 | 3/2000 | Funakoshi et al. | 95/130 X |

OTHER PUBLICATIONS

E. M. Flanigen and R. W. Grose, "Phosphorus Substitution in Zeolite Frameworks", in Molecular Sieve Zeolites–I, Advances in Chemistry Series 101, American Chemical Society, Washington, D.C., 1971, p. 76–101.

K. Wehner, J. Welker and G. Seidel, Chem. Technik (Leipzig), 21 (1969) 548–552 "Normalparaffine Mittlerer Kettenlänge und Ihre Gewinnung Nach dem Weiterentwickelten Parex–Verfahren".

W. Schirmer, K. Fielder, H. Stach and M. Suckow, Studies in Surface Science and Catalysis, vol. 46 (1989), "Fundamental Research and Modeling for a Technical Process of Selective Adsorption of Normal Paraffins ("PAREX"–Process of DDR) by Zeolite A", pp. 439–450.

J. A. Johnson and A. R. Oroskar, Studies in Surface Science and Catalysis, vol. 46 (1989), "Sorbex Technology for Industrial Scale Separation", pp. 451–467.

*Primary Examiner*—Robert H. Spitzer
*Attorney, Agent, or Firm*—Philip H. Von Neida; Salvatore P. Pace

[57] ABSTRACT

Adsorbent composites composed of microparticulate zeolites at least 90% of whose particles have a characteristic particle dimension not greater than about 0.6 micron and a macropore inert binder. The composites are useful for separating strongly adsorbed gas components from gas mixtures. Microparticulate type X zeolites composites are particularly useful for separating nitrogen or carbon dioxide from air.

38 Claims, No Drawings

ADSORBENTS AND ADSORPTIVE SEPARATION PROCESS

FIELD OF THE INVENTION

This invention relates to the separation of gases by adsorption, and more particularly to the adsorption of a selected gas from a gas mixture using very small sized zeolite particles.

BACKGROUND OF THE INVENTION

The separation of components of gas mixtures is of considerable industrial importance. When the separation is conducted on a large scale, fractional distillation is often employed. However, distillation is quite expensive because of the large initial capital cost of distillation equipment and the considerable energy required for the operation of such equipment. In recent times other separation methods have been investigated in efforts to reduce the overall cost of gas separations.

A gas separation technique that has been used as an alternative to distillation is adsorption. In early work in this field, Milton, in U.S. Pat. Nos. 2,882,243 and 2,882,244, described the preparation of novel crystalline aluminosilicates, which he called type A and type X zeolites, and the use of these materials to separate components of gas mixtures such as air. In U.S. Pat. No. 2,882,243, Milton described the preparation of zeolites having particle sizes in the range of 0.1 to 10 $\mu$m (microns). Milton used his new zeolites with some success for the adsorptive separation of nitrogen from oxygen.

Other workers in the field recognized the importance of using zeolites having small and uniformly sized crystals as adsorbents for gas separation processes. Robertson, in U.S. Pat. No. 4,173,622, described the production of zeolite A adsorbent having a particle size in the range of 1 to 10 microns. He prepared his adsorbent by seeding a sodium aluminum silicate using adsorbent nucleating particles having an average size less than about 0.5 micron. Similarly, Strack et al., in U.S. Pat. No. 4,303,629, described the production of type A zeolite in which 50% by weight of the particles have a maximum size of 4 microns. Kostinko, in U.S. Pat. No. 4,443,422, described the preparation of zeolite A having an average particle size of less than 1.7 microns and zeolite X having an average particle size of less than 2.2 microns. This patent gives a detailed summary of the patent literature in the field of zeolite preparation.

Small particle size adsorbent is difficult to use in cyclic adsorption processes because of the tendency of the fine particles to cake and consequently increase the pressure drop across a bed of such adsorbent. Small particle size material also has a tendency to fluidize and pass through screen material in the adsorption equipment. For this reason, zeolite crystals are formed into shaped particles, such as pellets, beads, etc., of macroscopic size, i. e., millimeter range size.

The rate of transport of adsorbed components of gas mixtures into adsorbents has been determined to be an important factor in the efficiency of adsorption processes. Research efforts are continually made to find ways to increase the rate of infusion and effusion of sorbed components into and out of adsorbent particles during the various steps of cyclic adsorption processes. The present invention presents new adsorbent products that accomplish this objective.

SUMMARY OF THE INVENTION

This invention covers novel adsorbent composites that allow utilization of the rapid infusion properties of microparticulate adsorbent particles and the ease of handling of large particle size material, the preparation of the novel adsorbent composites and the use of the composites in separation processes.

According to a first broad embodiment, the invention comprises a composite material comprising about 40 to about 95% by weight microparticulate zeolite, at least 90% of which has a particle size not greater than about 0.6 microns, and about 5 to about 60% by weight binder.

In a preferred embodiment, the composite material has an average pore size in the range of about 0.05 to about 10 microns.

In another preferred embodiment, the microparticulate zeolite is type A zeolite, alpha zeolite, type X zeolite, type Y zeolite or mixtures thereof. In a more preferred aspect, the microparticulate zeolite is type A zeolite or type X zeolite or mixtures thereof in which the atomic ratio of silicon to aluminum in the zeolite lattice is between 0.9 and 1.1.

In another preferred embodiment, the microparticulate zeolite is type X zeolite having at least 50% of its available exchangeable cation sites occupied by ions of group 1A, group 1B, group 2A, group 2B or mixtures of these. In a more preferred aspect, the ions are sodium ions, lithium ions, potassium ions, silver (I) ions, calcium ions, strontium ions or combinations of these.

In another preferred embodiment, at least 50% of the available exchangeable cation sites are occupied by lithium ions. In a more preferred aspect, about 50 to about 95% of the available exchangeable cation sites are occupied by lithium ions and about 5 to about 50% of such sites are occupied by (a) divalent cations selected from the group consisting of calcium ions, strontium ions, magnesium ions, barium ions, zinc ions, copper (II) ions and mixtures of these, (b) trivalent ions selected from the group consisting of aluminum, scandium, gallium, iron (III), chromium (III), indium, yttrium, single lanthanides, mixtures of two or more lanthanides, and mixtures of these, or (c) combinations of (a) and (b). In another more preferred aspect, about 70 to about 95% of the available exchangeable cation sites are occupied by lithium ions and about 5 to about 30% of such sites are occupied by (a) divalent cations selected from the group consisting of calcium ions, strontium ions, magnesium ions, barium ions, zinc ions, copper (II) ions and mixtures of these, (b) trivalent ions selected from the group consisting of aluminum, scandium, gallium, iron (III), chromium (III), indium, yttrium, single lanthanides, mixtures of two or more lanthanides, and mixtures of these, or (c) combinations of (a) and (b). When the zeolite contains trivalent ions, they are most preferably selected from aluminum, cerium, lanthanum, mixtures of two or more lanthanides in which the total lanthanum, cerium, praseodymium and neodymium ions present in the mixture comprise at least 50% of the total lanthanide ions, and mixtures of these.

In another preferred embodiment, the binder is selected from the group consisting of clay, alumina, silica gel and mixtures of these.

In another preferred embodiment, the composite of the invention comprises about 60 to about 90% by weight zeolite and about 10 to about 40% by weight binder.

In another preferred embodiment, the composite is mounted on a substrate. In this embodiment, the substrate is preferably in the form of stacked sheets or spirally wound sheet material, and adjacent surfaces of the stacked sheets or spirally wound sheet material are separated by spacers or by corrugations or protrusions in the sheet surfaces.

In another preferred embodiment, the composite is self-supporting. In this preferred embodiment, the composite further comprises inorganic, organic or metallic fibers.

According to a second broad embodiment, the invention comprises a method of producing microparticulate zeolite X comprising the steps:

(a) forming a first aqueous solution of sodium aluminate and triethanolamine;

(b) forming a second aqueous solution of sodium silicate and triethanolamine;

(c) blending the first and second aqueous solutions with sufficient agitation to produce a uniform reaction mixture, the ratios of the components of the first and second aqueous solutions being such that in the reaction mixture the silica to alumina molar ratio is in the range of about 2:1 to about 3.5:1; the sodium oxide to silica molar ratio is in the range of about 1.25:1 to about 1.6:1; the triethanolamine to silica molar ratio is in the range of about 4:1 to about 6.5:1 ; and the water to silica molar ratio is in the range of about 250:1 to about 1000:1;

(d) maintaining the reaction mixture at a temperature in the range of about 60 to about 100° C. for a period of about 35 to about 40 days; and (e) recovering from the reaction mixture microparticulate zeolite X at least 90% of the particles of which have a particle size not greater than about 0.6 microns.

In a preferred aspect of this second embodiment, one or both of the first and second aqueous solutions are filtered prior to step (c). In another preferred aspect of this embodiment, the temperature of the reaction mixture is maintained in the range of about 70 to about 85° C. during step (d). Another preferred aspect comprises washing the microparticulate zeolite X recovered during step (e) with water. Another preferred aspect comprises drying the water-washed microparticulate zeolite X.

According to a third broad embodiment, the invention comprises a method of separating a selected component from a gas mixture comprising a separation process including the step of passing the gas mixture through at least one adsorption zone containing the composite of the above-described first embodiment of the invention, thereby preferentially adsorbing the selected component from the gas mixture.

In a preferred aspect of this embodiment, the separation process is a cyclic adsorption process. Preferably, the cyclic adsorption process is pressure swing adsorption (PSA), temperature swing adsorption (TSA), or combinations of these.

In another preferred aspect of this embodiment, the component being adsorbed is nitrogen, carbon dioxide, argon, hydrocarbons or mixtures of these. In this aspect, the zeolite is preferably type A zeolite, type X zeolite or mixtures thereof.

In another preferred aspect of the third embodiment, the adsorption process is a cyclic adsorption process having an adsorption step that is generally carried out at a temperature in the range of about −190 to about 400° C. and an absolute pressure in the range of about 0.7 to 50 bar. In this preferred aspect the adsorption step is preferably carried out at a temperature in the range of about −50 to about 80° C. Additionally, it is preferred to conduct the adsorbent regeneration step at an absolute pressure in the range of about 0.1 to about 5 bar.

In another preferred aspect of the third embodiment, the component to be adsorbed is nitrogen, and the gas mixture is air. In this aspect, the zeolite preferably has a silicon to aluminum atomic ratio in the range of about 0.9 to 1.1. More preferably in this aspect, at least about 50% of the available exchangeable cation sites of the zeolite are occupied by lithium ions. The zeolite used in this aspect may have about 50 to about 95% of its available exchangeable cation sites occupied by lithium ions; and about 5 to about 50% of such sites occupied by (a) divalent cations selected from the group consisting of calcium ions, strontium ions, magnesium ions, barium ions, zinc ions, copper (II) ions and mixtures of these, (b) trivalent ions selected from the group consisting of aluminum, scandium, gallium, iron (III), chromium (III), indium, yttrium, single lanthanides, mixtures of two or more lanthanides, and mixtures of these, or (c) combinations of (a) and (b).

In another preferred aspect of the adsorption process embodiment of the invention, the method includes a temperature swing adsorption process, preferably carried out at a temperature in the range of about −50 to about 400° C., in which the adsorbent, which is preferably type A zeolite, type X zeolite or mixtures thereof, is regenerated at a temperature in the range of about 100 to about 350° C. This preferred aspect is particularly suitable when the component being adsorbed is carbon dioxide and the gas mixture is ambient air. In this aspect, the zeolite preferably has a silicon to aluminum atomic ratio in the range of about 0.9 to 1.1, and the preferred cation is sodium, potassium or mixtures thereof.

In the embodiment in which the adsorption method includes a pressure swing adsorption process, the adsorbent is preferably at least partly regenerated by countercurrent depressurization. It may be partly regenerated by depressurization to subatmospheric pressure by means of vacuum.

In another preferred aspect of the adsorption embodiment of the invention, the adsorbent may be at least partly regenerated by purging with the nonadsorbed product gas produced in the process.

DETAILED DESCRIPTION OF THE INVENTION

The rate of transport of molecules, for example, gas molecules, into and out of, the pores of an adsorbent material during the adsorption and desorption steps, respectively, of a cyclic adsorption process is, in general, inversely proportional to the square of the "characteristic" particle dimension, i.e., the appropriately chosen average dimension of the adsorbent particles used in the process. In other words, reducing the size of adsorbent particles by one-half will quadruple the rate of transport of gas molecules into and out of the adsorbent particles. In view of this, it would appear that using very fine adsorbent particles in an adsorption process would greatly enhance the efficiency of the adsorption process. Unfortunately, very small particles, for example particles having an average characteristic particle dimension less than about 1 micron, tend to fluidize during the adsorption and regeneration steps of fixed-bed cyclic adsorption processes, thereby increasing the pressure drop in the vessel in which the process is carried out. Fluidization of the adsorbent particles causes attrition of the particles, which results in a reduction of the useful life of the adsorbent. To minimize this effect, microparticles are usually compacted with binder to form a mechanically stable composite and to create, in addition to their micropore system, a macropore system to and around the adsorbent microparticles that is utilized as gas transport channel system. The characteristic particle dimension is referred to herein simply as "particle size".

To facilitate handling and use of adsorbent particles, it is customary to agglomerate the particles into shaped forms, such as beads or pellets. This is conventionally accomplished by, for example, blending the particles with an inert binder material, i. e., a mineral substance which does not itself possess significant adsorptive properties, but which does have the ability to bind the adsorbent particles, and forming shaped particles from the blended mixture, as by extrusion and pelletization, balling or tabletting. This technique is effective when the adsorbent particles have a characteristic particle dimension of about 1 micron or more. However, it has been found that when agglomerating very fine particle size adsorbent with inert binders, excessive masking of the micropores of the adsorbent particles may occur. In addition, average macropore diameter may decrease as a result of forming shaped particles, which may slow down rate of transport processes in those pores. Thus, any benefit of using fine adsorbent is offset by reduced effectiveness of the adsorbent.

An important aspect of this invention is forming the fine adsorbent particles into larger particles without adversely affecting the macroporosity of the adsorbent particles. This is accomplished by agglomerating the adsorbent particles with a binder material to produce a composite whose macropore system has an average pore size of at least about 0.05 to about 10 microns. Suitable binder materials include individual macroporous clays, silicas, aluminas, metal oxides, and mixtures of these, for example, binary compositions, such as silica-alumina, silica-magnesia, silica-zirconia, silica-thoria, silica-beryllia, and silica-titania, and ternary compositions, such as silica-alumina-thoria, silica-alumina-zirconia, etc.

It is also desirable to prepare the agglomerated particles under conditions such that access to the microporosity of adsorbent particles will not be diminished, but will, in fact, be facilitated. This is accomplished by wet blending mixtures of microparticulate adsorbent and binder material and forming them into shaped particles by techniques which minimize compaction of the adsorbent-binder mixture. A preferred agglomerating procedure is pan balling (beading), which causes less compaction than does extrusion or tabletting. It is preferred that the size of the aggregated particles be in the range of about 0.2 to about 5 mm.

It is often desirable to increase and stabilize the macroporosity of the adsorbent composites of the invention by including organic materials, such as cellulose, gums, polymeric fibers, etc., in the adsorbent-binder blend. The organic materials are burned off during the adsorbent calcination step, thereby significantly increasing the macroporosity of the adsorbent without significantly adversely affecting the abrasion resistance and crush strength of the particles.

Additionally or alternatively, liquid phase organic compounds, such as isopropyl alcohol or N-methyl-2-pyrollidone, may be added to aid dispersion of the microparticulate adsorbent and/or to help keep open access to the zeolitic pores during drying of the final adsorbent composite.

The very fast intrinsic uptake rates of the microparticulate zeolites of this invention may be very effectively utilized in composite geometries in which the effective dimension is minimized, and in which the pressure drop through the zeolite is minimized by the presence of many parallel narrow channels in the flow direction. These include, but are not limited to, stacked or spirally wound sheets and monolithic structures. In sheet structures, adjacent sheet surfaces may be separated from one another by spacers or by corrugations or embossed protrusions formed in the sheet surfaces themselves. The sheets may comprise substrates that are coated on one or both sides with microparticulate adsorbent combined with appropriate binders and organic additives. The substrate may be, for example, metal foil or a reinforcing material, such as a glass or organic fiber or metal mesh. Alternatively, the adsorbent composite may itself be a self-supporting composition of microparticulate adsorbent, appropriate binders and organic additives, in which case it may contain inorganic, organic or metallic fibers to give it sufficient strength and flexibility to undergo processing into the final massive adsorbent. In either case, the reinforcing material and the adsorbent composition should be stable under the conditions necessary to activate the adsorbent by the removal of water (e.g. drying at temperatures of about 200 to about 500° C).

The procedure of the invention can be used to prepare various synthetic zeolites. It is particularly useful for preparing type A zeolite, alpha type zeolite, type X zeolite, type Y zeolite or mixtures of these. Preferred type A zeolites are those having as charge compensating cations, i.e., ions that compensate the negative charge of the aluminosilicate lattice of the zeolite, ions of group 1A or group 2A of the periodic table. Included as preferred ions of these groups are sodium, potassium, lithium, calcium, magnesium, strontium and barium.

The most preferred adsorbents of the invention are those comprised of type A or type X zeolite having, as charge compensating cations, ions of group 1A, group 1B, group 2A and group 2B of the periodic table. Substantially all of the available exchangeable cation sites may be occupied by these cations, or about 50% or more of such sites may be occupied by the cations ions and the remainder occupied by other polyvalent ions.

Preferred monovalent ions for use on the zeolite include sodium, lithium, potassium and silver ions, or mixtures of these. The most preferred monovalent ions are sodium and lithium ions. Preferred divalent ions include calcium, magnesium, strontium and barium ions. The most preferred divalent ion is calcium.

In addition to the above-mentioned monovalent and divalent ion, the type X zeolite may contain trivalent ions. In a preferred aspect of this embodiment, about 95 to about 50% of the charge-compensating cations are lithium ions, about 4 to about 50% of the cations are trivalent ions, and 0 to about 15% are residual ions, i.e. ions associated with the zeolite as charge-compensating cations other than lithium and the above-mentioned trivalent ions. The residual ions may be present as a result of the procedure used to manufacture the cation exchanged type X zeolite, or they may be intentionally introduced into the zeolite to further modify its properties. In typical embodiments of the invention, about 70 to about 95% of the charge-compensating cations are lithium ions, about 5 to about 30% of the cations are trivalent ions, and 0 to about 10% are residual ions. Generally, the residual ions will be sodium, potassium, ammonium, hydronium, calcium, magnesium ions or mixtures of these. In some cases it may be desirable to use divalent cations, such as magnesium, calcium, strontium, barium, zinc or copper (II) ions as part or all of the residual ions, since divalent ion-exchanged type X zeolite has better nitrogen adsorption properties than do the sodium and potassium ion forms of this type X zeolite. As noted above it is preferred to limit the presence of divalent cations to less than about 5% of the total charge-compensating cations.

Particularly preferred adsorbents in the lithium- and trivalent ion-exchanged type X category include those in which about 50 to about 95% of the charge compensating cations are lithium ions and 5 to about 50% of such cations are trivalent ions selected from aluminum, scandium, gallium, yttrium, iron (III), i.e. ferric ion, chromium (III), i.e. chromic ion, indium ions and ions of the lanthanide series. The lanthanide series ions include lanthanum, cerium, praseodymium, neodymium, promethium, samarium, europium, gadolinium, terbium, dysprosium, holmium, erbium, thulium, ytterbium, and lutetium ions. Mixtures of any two or more of the above trivalent ions can also be used to make the adsorbent of the invention. Preferred trivalent cations include aluminum, cerium, lanthanum and lanthanide mixtures in which the combined concentrations of lanthanum, cerium, praseodymium and neodymium totals at least about 50%, and preferably at least about 75% of the total number of lanthanide ions in the mixtures.

Type X zeolite is crystalline aluminosilicate having a silicon to aluminum atomic ratio of 1.5 or less. The atomic ratio of silicon to aluminum in type X zeolite varies from a theoretical minimum of 1.0 to about 1.5, however due to defects in the structure of the zeolite, impurities, such as occluded alumina and/or aluminates, errors in measurement and defects in the structure, apparent silicon to aluminum ratios of type X zeolites as low as 0.9 have been measured. For purposes of this discussion, it is assumed that the minimum silicon to aluminum ratio of type X zeolite is 0.9. A preferred type X zeolite for use in preparing the novel adsorbents of the invention is that having a silicon to aluminum atomic ratio less than about 1.25. The most preferred type X zeolite is that having a silicon to aluminum atomic ratio of about 0.9 to about 1.10, which is commonly referred to as low silicon X (LSX) zeolite.

Type A and type X zeolites are generally synthesized in their sodium and/or potassium ion form. When it is desired to exchange the as-synthesized zeolites with other charge-compensating cations, it may be desirable to convert all of the cations to a single cation species, preferably the sodium or ammonium ion form, prior to preparation of the other cation-exchanged adsorbents of the invention. For example such adsorbents can be prepared by cation exchanging the sodium-, potassium-, sodium and potassium- or ammonium-exchanged adsorbent with a solution of lithium compounds and solutions of compounds of the above-mentioned trivalent ions. It is preferable, although not absolutely necessary, to use aqueous solutions of the exchange ions. Any water-soluble compound of the exchanging ions can be used. The preferred water soluble compounds of the ions are the salts, particularly the chlorides, sulfates and nitrates. The most preferred salts are the chlorides because of their high solubilities and ready availability.

In preparing lithium- and polyvalent cation-exchanged adsorbents, the order of cation exchange is not critical. One procedure is to first exchange the base adsorbent with, for example, lithium ions and then exchange the lithium-exchanged adsorbent with one or more polyvalent ions. In some cases it may be desirable to first cation exchange the polyvalent ion to the desired exchange level, then optionally calcine the partly exchanged zeolite beads and then conduct the lithium exchange. A third method is to simultaneously exchange the base adsorbent with lithium ions and the desired one or more trivalent ions.

An important aspect of the invention is that at least 90% of the adsorbent particles have a characteristic particle dimension not greater than about 0.6 micron, and at least 99% of the microparticles have a characteristic microparticle dimension not greater than about 1 micron. This result is obtained by synthesizing the adsorbent under carefully controlled conditions according to the following procedure.

A hydrogel is formed by making a solution of an aluminum source, for example sodium aluminate or hydrated aluminum hydroxide; a source of silica, for example sodium silicate solution or hydrated sodium metasilicate; sodium hydroxide; and ammonium hydroxide and/or triethanolamine as a stabilizing and buffering agent; and very intensely mixing the solution at a temperature in the range of about 20 to about 60° C., and preferably at a temperature in the range of about 20 to about 30° C., for up to about an hour. The relative amounts of the components in the mixture are such that in the mixture the silica to alumina molar ratio will be in the range of about 2:1 to about 3.5:1; the sodium oxide to silica molar ratio will be in the range of about 1.25:1 to about 1.6:1; the triethanolamine to silica molar ratio will be in the range of about 4:1 to about 6.5:1 ; and the water to silica molar ratio will be in the range of about 250:1 to about 1000:1. The hydrogel is then subjected to crystallization by maintaining it in a suitable container, for example, a sealed teflon-lined autoclave or a polypropylene flask, at a temperature in the range of about 60 to about 100° C. for a suitable period of time, preferably with very intensive mixing. The resulting product is fully crystalline A zeolite or fully crystalline X zeolite at the larger end of the crystallite size range typical of microparticulate material as defined above, or partially or fully X-ray amorphous zeolite of the two types at the lower end of the crystallite size range, i.e., distinctly smaller than 0.6 micron.

A preferred method of making the hydrogel mixture is to separately form sodium aluminate-triethanolamine and sodium metasilicate-triethanolamine aqueous solutions, preferably using de-ionized water, with each of the solutions containing half of the total amount of triethanolamine; optionally filter one or both aqueous solutions using, for example, Whatman filter paper and/or a Gelman Sciences Supor 200 membrane filter having a pore size of 0.2–1 microns, the filtration being accomplished with or without the aid of vacuum; and blending the two aqueous solutions with sufficient agitation to produce a uniform mixture. As noted above, the mixing process can be carried out at a temperature in the range of about 20 to about 60° C., but is preferably carried out at a temperature in the range of about 20 to about 30° C., for a period of up to about 1 hour.

For the microparticulate zeolite A-type synthesis, a most preferred method is as follows. The hydrogel prepared as described above, is subjected to crystallization by heating it in a suitable container, for example, a sealed teflon-lined autoclave or a polypropylene flask, at a temperature in the range of about 60 to about 80° C. for about 6 to about 21 hours, preferably with very intensive mixing. The requisite mixing intensity can be achieved by, for example, ultrasound treatment at a frequency of, for example 43 kHz.

A most preferred method of making microparticulate aluminosilicate zeolite X with extremely small primary particles, e.g., $\leq 0.5$ micron, comprises the following steps: First, prepare a hydrogel by the above-described procedure comprising vigorously mixing and optionally filtering separately prepared sodium aluminate and sodium silicate solutions. Then, maintain the hydrogel at a temperature in the range of about ambient to about 100° C., and preferably at about 75° C. for a period of about 30 to about 50 days. Finally, separate the solid product from the solution by filtration, washing with water, preferably with deionized water or about 0.01 N sodium hydroxide solution, and drying at a temperature of about ambient temperature to about 110° C. The resulting product is of both an extremely high crystallinity and an ultra-fine microparticulate morphology ($\leq 0.5$ $\mu$m). Agitation of the gel during the process of crystallization and/or the use of shorter crystallization time at higher temperature results in the production of even smaller crystal size adsorbent, for which determination of the true size and morphology of the crystals is difficult, due to the inherent uncertainty associated with visualization of objects of this size.

Microparticulate LSX zeolite material in its primary sodium-potassium cation form can be produced by the above procedure with appropriate selection of the ratios of the reactants.

Microparticulate zeolites of the types A and X as synthesized in accordance with the foregoing description can be cation exchanged at, for example, 80° C. into the sodium form using multiple static exchanges with about 1.0 N aqueous sodium chloride solution and intermediate washing with about 0.01 aqueous NaOH solution. The resulting forms can be made into pellets by compaction in a die (without a binder) followed by crushing and sieving to 20–40 mesh size. Subsequent lithium and rare-earth cation exchanges can be carried out on the resulting samples at, for example, 80° C. for about 20 hours. The final lithium-rare earth zeolite modifications of microparticulate morphology can be prepared by washing the exchanged zeolites with large volumes of de-ionized water and drying the washed zeolites overnight at ambient temperature.

Adsorbent pellets may be prepared from microparticulate type A or type X zeolite synthesized by the above procedure by blending the zeolite with a binder, for example attapulgite or other type of clay; shaping the blended zeolite-binder mixture into aggregate particles; and calcining the shaped aggregate particles at a temperature of about 400 to about 800° C.. Ion exchange of the microparticulate adsorbent can be conducted before or after agglomeration of the adsorbent. Ion exchange after agglomeration can be carried out by, for example, contacting the calcined aggregate particles with an aqueous solution of the desired ions, for example lithium and/or rare earth ions, thereby substituting the exchangeable cations initially on the particles with the selected exchange ions. The ion-exchanged particles can be activated by heating them to a temperature of about 200 to about 800° C.

In the adsorption process embodiment of the invention, a component of a gas mixture that is more strongly adsorbed than other components of the gas mixture is separated from the other components by contacting the gas mixture with the adsorbent under conditions which effect adsorption of the strongly adsorbed component. Preferred adsorption processes include PSA, including vacuum swing adsorption (VSA), TSA and combinations of these.

The temperature at which the adsorption step of the adsorption process is carried out depends upon a number of factors, such as the particular gases being separated, the particular adsorbent being used, and the pressure at which the adsorption is carried out. In general, the adsorption step of the process is carried out at a temperature of at least about −190° C., preferably at a temperature of at least about −20° C., and most preferably at a temperature of at least about 0° C. The upper temperature limit at which the adsorption step of the process is carried out is generally about 400° C., and the adsorption step is preferably carried out at temperatures not greater than about 70° C., and most preferably carried out at temperatures not greater than about 50° C.

The adsorption step of the process of the invention can be carried out at any of the usual and well known pressures employed for gas phase temperature swing adsorption and pressure swing adsorption processes. Typically the minimum absolute pressure at which the adsorption step is carried out is generally about 0.7 bara (bar absolute), preferably about 0.8 bara and most preferably about 0.9 bara. The adsorption can be carried out at pressures as high as 50 bara or more, but is preferably carried out at absolute pressures, and preferably not greater than about 20 bara, and most preferably not greater than about 10 bar.

When the adsorption process is PSA, the pressure during the regeneration step is reduced, usually to an absolute pressure in the range of about 0.1 to about 5 bara, and preferably to an absolute pressure in the range of about 0.175 to about 2 bara, and most preferably to an absolute pressure in the range of about 0.2 to about 1.1 bara. When the adsorption process is TSA, the bed temperature is raised during bed regeneration. The regeneration temperature can be any temperature below which the adsorbent begins to degenerate. In general, the temperature of the adsorbent is usually raised during regeneration to a value in the range of about 0 to about 400° C., is preferably raised to a value in the range of about 25 to about 300° C., and is most preferably raised to a value in the range of about 70 to about 250° C. The regeneration procedure may be a combination of PSA and TSA, in which case both the pressure and temperature used during regeneration will be varied within the above-stated ranges.

As indicated above, the process of the invention can be used to separate any two gases, provided that one of the gases is more strongly adsorbed by the adsorbents of the invention than is the other gas under either conditions of equilibrium or non-equilibrium, i. e., in the kinetic regime of a process. The process is particularly suitable for separating nitrogen from oxygen, nitrogen and argon from oxygen, carbon dioxide from air, dinitrogen oxide from air and for the separation of hydrocarbons, for example, the separation of alkenes, such as ethylene, propylene, etc., from alkanes, such as ethane, propane, etc., and the separation of straight-chain hydrocarbons from branched-chain hydrocarbons, e.g., the separation of n-butane from i-butane. Type A zeolites with appropriate cation compositions are particularly suitable for the separation of alkenes from alkanes, n-alkanes from i-alkanes and carbon dioxide from alkanes, alkenes and acetylene. The separation of these gases is preferably carried out at ambient temperature or higher, although the separation of nitrogen, oxygen and argon can be carried out at cryogenic temperatures.

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a weight basis.

The samples produced in the examples were analyzed by Inductively Coupled Plasma Atomic Emission spectroscopy (ICP-AES) using a Perkin Elmer Optima 3000 ICP Spectrometer. The particle size of the samples was determined by scanning electron microscopy (SEM) on a Hitachi S-520 microscope, the X-ray diffraction pattern of the samples was measured by a Philips APD 3600/2 diffractometer, and the chemical composition of the samples was determined by inductively coupled plasma emission spectrometry (ICP) using an ARL-3510 Sequential ICP spectrometer. The accuracy of estimation of the size and morphology of crystals having a particle size of about 0.6 micron or less suffers from the inherent uncertainty associated with visualization of objects of this size.

EXAMPLE 1

Microparticulate type A zeolite was prepared from a hydrogel containing 18.55 g of sodium aluminate (56.2%

$Al_2O_3$, 38.6% $Na_2O$ and 5.2% $H_2O$), 43.31 g of sodium silicate solution (29.8% $SiO_2$, 8.8% $Na_2O$ and 61.4% $H_2O$), 35.22 g of sodium hydroxide and 48.00 g of ammonium hydroxide solution. The sodium aluminate was dissolved in sodium hydroxide solution followed by the addition of ammonium hydroxide solution under stirring. The sodium silicate solution, diluted with a part of the water, (total amount: 166.11 g; HPLC grade), was added under intense stirring. The mixing process takes place at a temperature in the range of 20 and 60° C., but preferentially, at low temperature, between 20 and 30° C., over a time period of less than 1 hour. The resulting gel with a composition, $SiO_2/Al_2O_3$ (moles): 2.1; $Na_2O+(NH_4)_2O/ SiO_2$: 3.76; $Na_2O/ (Na_2O+(NH_4)_2O$: 0.76; $H_2O/SiO_2$: 61.9, was placed in a sealed teflon-lined autoclave (or a polypropylene flask), heated to a temperature of 60° C. and maintained at this temperature for a time of about 6 to about 21 hours, with separate experiments being performed at individually chosen reactions times in this time range. The product was separated by filtration, washed with 0.01 N sodium hydroxide solution and dried at 110° C. Its measured particle size was less than 0.5 micron. Its X-ray diffraction pattern revealed a product typical of zeolite A for any crystallization time within the above range. The chemical composition of primary particles is characterized by Si/Al: 1.00 and Na/Al: 1.00. The molar composition of the as-synthesized LTA is specified at the end of Example 6.

EXAMPLE 2

Microparticulate materials were prepared as described in Example 1 where the crystallization temperature was chosen as 60, 80 and 100° C., and the crystallization time was varied between 6 and 12 hours. In each case, the resulting product material possessed a particle size less than 0.5 micron. The product was a pure LTA zeolite for syntheses performed at temperatures in the range 60 to 80° C. after any of the crystallization times of the above range, but a mixture of LTA type zeolite and sodalite or pure sodalite after a crystallization time of 6 hours at 100° C. or 8–12 hours at 100° C., respectively. For the LTA zeolite, the molar Si/Al and Na/Al ratios were, respectively, found to be 0.99 and 0.98 (60° C.) and 0.99 and 0.99 (80° C.). For the sodalite zeolite, the molar Si/Al and Na/Al ratios were, respectively, found to be 1.00 and 1.27 (100° C.). The molar composition of the as-synthesized LTA is given after Example 6.

EXAMPLE 3

A microparticulate material was prepared as described in Example 1, from a hydrogel containing 17.90 g sodium aluminate (56.2% $Al_2O_3$, 38.6% $Na_2O$ and 5.2% $H_2O$), 42.31 g sodium silicate solution (29.8% $SiO_2$, 8.8% $Na_2O$ and 61.4% $H_2O$) and 35.65 g sodium hydroxide. The water (HPLC grade) amount to dilute the reaction mixture was 199.66 g. Again, it had been added under intense stirring. The resulting molar gel composition was $SiO_2/Al_2O_3$ (moles): 2.1; $Na_2O+(NH_4)_2O/ SiO_2$: 2.91; $H_2O/SiO_2$: 61.9. The gel was placed in a sealed teflon-lined autoclave (or a polypropylene flask), heated to a temperature of 60° C. and maintained at this temperature for a time of 2 to 7 hours. The product obtained after any crystallization time in this range, was separated by filtration, washed with 0.01 N sodium hydroxide solution and dried at 110° C. Its particle size was less than 0.5 micron. Its X-ray diffraction pattern revealed a product typical of zeolite A. The chemical composition of primary particles is characterized by Si/Al: 1.00 and Na/Al: 1.00. The molar composition of the as-synthesized LTA is given after Example 6.

EXAMPLE 4

A microparticulate material was prepared as described in Example 1, from a hydrogel containing 19.90 g sodium aluminate (56.2% $Al_2O_3$, 38.6% $Na_2O$ and 5.2% $H_2O$), 42.31 g sodium silicate solution (29.8% $SiO_2$, 8.8% $Na_2O$ and 61.4% $H_2O$) and 52.62 g sodium hydroxide. The amount of water (HPLC grade) to dilute the reaction mixture was 195.83 g. Again, it had been added under intense stirring. The resulting molar gel composition was $SiO_2/Al_2O_3$ (moles): 2.1; $Na_2O+(NH_4)_2O/ SiO_2$: 3.9; $H_2O/SiO_2$: 61.9. The gel was placed in a sealed teflon-lined autoclave (or a polypropylene flask), heated to a temperature of 60° C. and maintained at this temperature for a time of 2 to 7 hours. The product obtained after any crystallization time in this range, was separated by filtration, washed with 0.01 N sodium hydroxide solution and dried at 110° C. Its particle size was less than 0.5 micron. Its X-ray diffraction pattern revealed a product typical of zeolite A. The chemical composition of primary particles is characterized by Si/Al: 0.99 and Na/Al: 0.99. The molar composition of the as-synthesized LTA is given after Example 6.

EXAMPLE 5

Experiments performed in accordance with Example 3 except crystallization time that was chosen within a range of 0.5 and 1.5 hours, revealed amorphous reaction products.

EXAMPLE 6

A microparticulate material was prepared as described in Example 1, from a hydrogel containing 143.18 g sodium aluminate (56.2% $Al_2O_3$, 38.6% $Na_2O$ and 5.2% $H_2O$), 339.12 g sodium silicate solution (29.8% $SiO_2$, 8.8% $Na_2O$ and 61.4% $H_2O$) and 260.77 g sodium hydroxide. The water (HPLC grade) amount to dilute the reaction mixture was 1,600 g. Again, it had been added under intense stirring. The resulting molar gel composition was $SiO_2/Al_2O_3$ (moles): 2.0; $Na_2O+(NH_4)_2O/ SiO_2$: 2.91; $H_2O/SiO_2$: 64.7. The gel was placed in a sealed teflon-lined autoclave (or a polypropylene flask), heated to a temperature of 60° C. and maintained at this temperature for a time of 14 hours. The product obtained after any crystallization time in this range, was separated by filtration, washed with 0.01 N sodium hydroxide solution and dried at 110° C. Its particle size was less than 0.6 micron. Its X-ray diffraction pattern revealed a product typical of zeolite A. The chemical composition of primary particles is characterized by Si/Al: 1.00 and Na/Al: 1.01.

If the synthesis was performed at 77° C., the result was identical.

The molar composition of the as-synthesized LTA zeolite materials of Examples 1–6 is as follows: (0.95–1.0) $Na_2O$: $Al_2O_3$: (1.9–2.1) $SiO_2$: (4.2–4.9) $H_2O$.

EXAMPLE 7

A microparticulate material was prepared from a hydrogel containing 10.84 g sodium aluminate (57.0% $Al_2O_3$, 40.2% $Na_2O$ and 3.6% $H_2O$), 50 g sodium metasilicate (21.8% $SiO_2$, 21.2% $Na_2O$ and 57.0% $H_2O$), 114.70 g triethanolamine (98%) and 818.6 g water (de-ionized). The resulting gel with a composition, $SiO_2/Al_2O_3$ (moles): 3.0; $Na_2O / SiO_2$: 1.3; $H_2O/SiO_2$: 259.3, was placed in a sealed teflon-lined autoclave (or a polypropylene flask), heated to a temperature of 75° C. and maintained at this temperature for a time of 38 days. The product was separated by filtration, washed with 0.01 N sodium hydroxide solution and dried at 110° C. Its particle size was less than 0.5 micron. Agitation of the gel during the process of crystallization or the use of shorter crystallization time at higher temperature produced even smaller crystals the size of which could not be estimated reliably for the above mentioned reasons. On the other hand, if crystallization is allowed to proceed beyond the given time, bigger crystals result. Its X-ray diffraction pattern revealed a product mixed of X-type zeolite and amorphous material. The chemical composition of the synthesis product is characterized by Si/Al: 1.7 and Na/Al: 1.11.

EXAMPLE 8

A microparticulate material was prepared from a hydrogel containing 16.23 g sodium aluminate (57.0% $Al_2O_3$, 40.2% $Na_2O$ and 3.6% $H_2O$), 50 g sodium metasilicate (21.8% $SiO_2$, 21.2% $Na_2O$ and 57.0% $H_2O$), 114.70 g triethanolamine (98%) and 819.01 g water (de-ionized). The resulting gel with a composition, $SiO_2/Al_2O_3$ (moles): 2.0; $Na_2O / SiO_2$: 1.5; $H_2O/SiO_2$: 259.5, was placed in a sealed teflon-lined autoclave (or a polypropylene flask), heated to a temperature of 75° C. and maintained at this temperature for a time of 38 days. The product was separated by filtration, washed with 0.01 N sodium hydroxide solution and dried at 110° C. Its particle size was less than 0.5 micron. Agitation of the gel during the process of crystallization or the use of shorter crystallization time at higher temperature produced even smaller crystals the size of which could not be estimated reliably for the above mentioned reasons. On the other hand, if crystallization is allowed to proceed beyond the given time, bigger crystals result. Its X-ray diffraction pattern revealed the product as X-type. The chemical composition of the synthesis product is characterized by Si/Al: 1.39 and Na/Al: 1.04.

EXAMPLE 9

A microparticulate material was prepared from a hydrogel containing 24.36 g sodium aluminate (57.0% $Al_2O$, 40.2% $Na_2O$ and 3.6% $H_2O$), 75.02 g sodium metasilicate (21.8% $SiO_2$, 21.2% $Na_2O$ and 57.0% $H_2O$), 172.08 g triethanolamine (98%)—as a stabilizing and buffering agent—and 1,228.55 g water (de-ionized). The resulting gel with a composition, $SiO_2/Al_2O_3$ (moles): 2.0; $Na_2O / SiO_2$: 1.5; $H_2O/SiO_2$: 259.5, was placed in a sealed teflon-lined autoclave (or a polypropylene flask), heated to a temperature of 75° C. and maintained at this temperature for a time of 35.7 days. The product was separated by filtration, washed with 0.01 N sodium hydroxide solution and dried at 110° C. Its particle size was less than 0.5 micron. Agitation of the gel during the process of crystallization or the use of shorter crystallization time at higher temperature produced even smaller crystals the size of which could not be estimated reliably for the above mentioned reasons. On the other hand, if crystallization is allowed to proceed beyond the given time, bigger crystals result. Its X-ray diffraction pattern revealed the product as a mixture of X-type zeolite and microparticulate amorphous material. The chemical composition of the synthesis product is characterized by Si/Al: 1.38 and Na/Al: 1.03.

Under identical conditions except crystallization time that was increased to 39.7 days, a pure microparticulate X-type zeolite phase with a particle size less than 0.5 micron, was obtained. The chemical composition of this synthesis product is characterized by Si/Al: 1.27, and Na/Al: 1.03.

EXAMPLE 10

Portions of microparticulate samples of zeolites A and X that were synthesized in accordance with Examples 6 and 9, respectively, were ion exchanged into their sodium forms using four static cation exchange procedures, each with 20 ml of 1.0 N NaCl solution per gram of zeolite, at 80° C. After each exchange, the sample was washed with an aqueous 0.01 N NaOH solution. The resulting Na forms were made into pellets by compacting them together with a dye (without a binder), followed by crushing and sieving the resulting particles into 20–40 mesh size fraction. Subsequently, lithium ion-exchanges were carried out on the resulting samples, using three static exchange procedures with an aqueous 0.2–3.0 N LiCl solution (adjusted to a pH value of 9 by concentrated LiOH solution), each containing four-fold excesses of lithium ions over the quantity of the base sodium cations. The exchanges were carried out at 79° C. for about 20 hours. The final lithium exchanged samples were washed with a large volume of de-ionized water and dried at ambient temperature overnight. The resulting samples were microparticulate lithium A-type and microparticulate lithium X-type zeolites with the following respective compositions: Na/(Na+Li): 0.01, and Li/(Na+Li): 0.99; and Na/(Na+Li): 0.05, and Li/(Na+Li): 0.95.

EXAMPLES 11 and 12

In these examples, adsorption of nitrogen ($N_2$) and oxygen ($O_2$) were measured gravimetrically using a Cahn 2000 Series microbalance enclosed in a stainless steel vacuum/pressure system. Pressure measurements in the range 1–10,000 mbar were made using a MKS Baratron pressure sensor. In separate experiments, about 100 mg of each sample, microparticulate lithium A-type (1) and microparticulate lithium X-type zeolites (2), was carefully evacuated and its temperature increased to 350° C. at a rate of 1–2° C. per minute. The adsorption isotherms were measured at 25° C. in the pressure range of 20–6,800 mbar for $N_2$ and in the pressure range of 20–2,000 mbar for $O_2$, and at liquid nitrogen temperature (−196° C.) in the pressure range of 5–210 mbar for $O_2$. Adsorption data is presented in the Table.

TABLE

Composition and adsorption data (25° C.) for samples of this invention.

| Example No. | Sample Identity | Na/ (Na + Li) | Li/ (Na + Li) | $N_2$ uptake, mmol/g, at 1 atm | Effective $N_2$ uptake, mmol/g, over (1250-250) mbar of pressure | Selectivity $N_2/O_2$ at 1500 mbar of air |
|---|---|---|---|---|---|---|
| 11 | Microparticulate Li-A | 0.01 | 0.99 | 0.87 | 0.67 | 9.4 |
| 12 | Microparticulate Li-X | 0.05 | 0.95 | 0.76 | 0.54 | 8.5 |

Although the invention has been described with particular reference to specific equipment arrangements and to specific experiments, these features are merely exemplary of the invention and variations are contemplated. The scope of the invention is limited only by the breadth of the appended claims.

What is claimed is:

1. A porous composite comprising about 40 to about 95% by weight microparticulate zeolite, at least 90% of which has a particle size not greater than about 0.6 micron, and about 5 to about 60% by weight binder.

2. The composite of claim 1, wherein said zeolite is type A zeolite, alpha zeolite, type X zeolite, type Y zeolite and mixtures of these.

3. The composite of claim 2, having an average pore size in the range of about 0.05 to about 10 microns.

4. The composite of claim 3, wherein the zeolite is type A or type X zeolite and the atomic ratio of silicon to aluminum in the zeolite lattice is between 0.9 and 1.1.

5. The composite of claim 2 or claim 4, wherein at least 50% of the available exchangeable cation sites of said type X zeolite are occupied by ions of group 1A, group 1B, group 2A, group 2B or mixtures of these.

6. The composite of claim 5, wherein said ions are sodium ions, lithium ions, potassium ions, silver (I) ions, calcium ions, strontium ions, or combinations of these.

7. The composite of claim 6, wherein said ions are lithium ions.

8. The composite of claim 7, wherein, of the available exchangeable cation sites, about 50 to about 95% are occupied by lithium ions and about 5 to about 50% are occupied by (a) divalent cations selected from the group consisting of calcium ions, strontium ions, magnesium ions, barium ions, zinc ions, copper (II) ions and mixtures of these; (b) ions further selected from the group of trivalent ions consisting of aluminum, scandium, gallium, iron (II), chromium (III), indium, yttrium, single lanthanides, mixtures of two or more lanthanides, and mixtures of these, or (c) combinations of (a) and (b).

9. The composite of claim 1, wherein about 70 to about 95% of the available exchangeable cation sites are occupied by lithium ions and about 5 to about 30% of such sites are occupied by (a) divalent cations selected from the group consisting of calcium ions, strontium ions, magnesium ions, barium ions, zinc ions, copper (II) ions and mixtures of these, (b) trivalent ions selected from the group consisting of aluminum, scandium, gallium, iron (III), chromium (III), indium, yttrium, single lanthanides, mixtures of two or more lanthanides, and mixtures of these, or (c) combinations of (a) and (b).

10. The composite of claim 1, wherein said binder is selected from the group consisting of clay, alumina, silica gel and mixtures of these.

11. The composite of claim 10, comprising about 60 to about 90% by weight zeolite and about 10 to about 40% by weight binder.

12. The composite of claim 1, mounted on a substrate.

13. The composite of claim 12, wherein said substrate is in the form of stacked sheets or spirally wound sheet material, and wherein adjacent surfaces of said stacked sheets or spirally wound sheet material are separated by spacers or by corrugations or protrusions in the sheet surfaces.

14. The composite of claim 1, wherein said composite is self-supporting.

15. The composite of claim 14, further comprising inorganic, organic or metallic fibers.

16. A method of separating a component from a gas mixture comprising subjecting said gas mixture to an adsorption process comprising the steps:
  (a) passing said gas mixture through at least one adsorption zone containing as adsorbent the porous composite of any one of claims 1, 12 or 14 at a selected temperature and a selected pressure, thereby preferentially adsorbing said component from said gas mixture, and
  (b) regenerating said adsorbent at a temperature higher than said selected temperature, at a pressure lower than said selected pressure or at both a temperature higher than said selected temperature and a pressure lower than said selected pressure.

17. The method of claim 16, wherein said adsorption process is a cyclic adsorption process.

18. The method of claim 17, wherein said microparticulate zeolite is type A zeolite, type X zeolite or mixtures thereof.

19. The method of claim 18, wherein said component is selected from the group consisting of nitrogen, carbon dioxide, argon, hydrocarbons or mixtures of these.

20. The method of claim 16, wherein said selected temperature has a range of about −190 to about 400° C. and said selected pressure has a range of about 0.7 to 50 bar.

21. The method of claim 20, wherein said adsorption step is carried out at a selected temperature in the range of about −50 to about 80° C.

22. The method of claim 21, wherein said cyclic adsorption process is pressure swing adsorption.

23. The method of claim 22, wherein said component is nitrogen and said gas mixture is air.

24. The method of claim 23, wherein said zeolite has a silicon to aluminum ratio in the range of about 0.9 to 1.1.

25. The method of claim claim 24, wherein at least about 50% of the available exchangeable cation sites of said zeolite are occupied by lithium ions.

26. The method of claim 25, wherein about 50 to about 95% of the available exchangeable cation sites of said zeolite are occupied by lithium ions; and about 5 to about 50% of such sites are occupied by (a) divalent cations selected from the group consisting of calcium ions, strontium ions, magnesium ions, barium ions, zinc ions, copper II ions and mixtures of these (b) trivalent ions selected from the group consisting of aluminum, scandium, gallium, iron (III), chromium (III), indium, yttrium, single lanthanides, mixtures of two or more lanthanides, and mixtures of these, or (c) combinations of (a) and (b).

27. The method of claim 22, wherein said adsorbent is at least partly regenerated by countercurrent depressurization.

28. The method of claim 27 wherein said adsorbent is partly regenerated by depressurization to subatmospheric pressure by means of vacuum.

29. The method of claim 27, wherein said adsorbent is partly regenerated by purging the bed with nonadsorbed product gas produced in the cyclic adsorption process.

30. The method of claim 21, wherein said cyclic adsorption process is temperature swing adsorption.

31. The method of claim 30, wherein said component is carbon dioxide and said gas mixture is ambient air.

32. The method of claim 31, wherein said zeolite has a silicon to aluminum ratio in the range of about 0.9 to 1.1.

33. The method of claim 32, wherein the exchangeable cations of said zeolite are sodium ions, potassium ions or mixtures thereof.

34. A method of producing microparticulate zeolite X comprising the steps:
  (a) forming a first aqueous solution of sodium aluminate and triethanolamine;
  (b) forming a second aqueous solution of sodium silicate and triethanolamine;
  (c) blending said first and second aqueous solutions with sufficient agitation to produce a uniform reaction mixture, the ratios of the components of said first and second aqueous solutions being such that in said reaction mixture the silica to alumina molar ratio is in the range of about 2:1 to about 3.5:1; the sodium oxide to silica molar ratio is in the range of about 1.25:1 to about 1.6:1; the triethanolamine to silica molar ratio is in the range of about 4:1 to about 6.5:1 ; and the water to silica molar ratio is in the range of about 250:1 to about 1000:1;

(d) maintaining said reaction mixture at a temperature in the range of about 60 to about 100° C. for a period of about 35 to about 40 days; and (e) recovering from said reaction mixture microparticulate zeolite X at least 90% of the particles of which have a particle size not greater than about 0.6 microns.

35. The method of claim 34, wherein said one or both of said first and second aqueous solutions are filtered prior to step (c).

36. The method of claim 35, wherein during step (d) the temperature of said reaction mixture is maintained in the range of about 70 to about 85° C.

37. The method of claim 34, further comprising water washing the microparticulate zeolite X.

38. The method of claim 37, further comprising drying the water-washed microparticulate zeolite X.

* * * * *